United States Patent Office 3,180,871
Patented Apr. 27, 1965

3,180,871
PRODUCTION OF PYRIDINE BASES AND ALKYL NITRILES
Kenneth Raymond Hargrave, Kirkella, England, assignor to The Distillers Company Limited, Edinburgh, Scotland, a British company
No Drawing. Filed July 2, 1962, Ser. No. 207,094
Claims priority, application Great Britain, July 6, 1961, 24,410/61
7 Claims. (Cl. 260—290)

The present invention relates to the preparation of organic nitriles and of pyridine bases or derivatives thereof.

In the production of pyridine and alkylpyridine bases from natural materials or synthetic reaction products, a high-boiling fraction is commonly obtained which is a mixture of alkylpyridines and other compounds which is of little commercial value as such. It is an object of the present invention to provide a process for the production of useful materials from this mixture. The mixture will be referred to in this specification as "the pyridine high-boilers."

According to the present invention the process for the production of organic nitriles and of pyridine bases or derivatives thereof comprises reacting pyridine high-boilers in the vapour phase at an elevated temperature with ammonia and molecular oxygen over a catalyst useful in the production of cyanopyridines from methylpyridines, and heating the product in the liquid phase with a carboxylic acid.

In the process of the invention the reaction of the pyridine high-boilers with ammonia and oxygen in the presence of the catalyst results in the introduction of nitrile groups into the organic base molecules, to give a mixture of pyridine base nitriles, pyridine bases and other compounds. In a second stage reaction with the organic carboxylic acid results in nitrile exchange reactions, producing the organic nitrile corresponding to the carboxylic acid employed and carboxylic acids corresponding to the pyridine base nitriles formed. According to the conditions of the reaction, the carboxylic acids may remain as such, and be recovered from the reaction mixture, or they may be decarboxylated, and lower molecular weight pyridine bases may be recovered. Substantial quantities of low-boiling bases, such as pyridine itself, may be recovered in this manner.

Catalysts useful in the first stage of the process of this invention are those which are suitable for the conversion of methylpyridines to cyanopyridines in the presence of ammonia or an oxygen-containing gas, such as a mixture of the oxides of vanadium, molybdenum and phosphorus. The preferred catalyst is vanadium pentoxide supported on alumina; the alumina is preferably heated to a temperature between 1000° C. and 1450° C. before being impregnated with a vanadium compound which is subsequently converted to the pentoxide. Such a catalyst is described in British Patent No. 777,746.

The reaction of the pyridine high-boilers with ammonia and the oxygen-containing gas may suitably take place in a reactor containing the catalyst and maintained at a temperature within the range 350°–380° C. The pyridine high-boilers may be vaporised and mixed with the gaseous reactants, and thereafter fed to the reactor. The oxygen-containing gas may be oxygen or oxygen diluted with an inert gas such as nitrogen. The oxygen may suitably be supplied in the form of air. Sufficient air, or other oxygen-containing gas, should be present in the mixture to keep the reaction under control; it is preferred to use a reaction mixture containing between 2% and 10% by volume of the vapour of the pyridine high-boilers based on the combined volume of air and vapour of the pyridine high-boilers, together with a large excess of ammonia, for example 3–5 moles per mole of alkyl-pyridines, the molar proportions being based on the average molecular weight of the alkyl pyridine constituents of the pyridine high-boilers mixture.

The product of the first-stage reaction separates into an organic phase and an aqueous phase. The aqueous phase may be extracted with, for example, benzene, and the extract may be dehydrated and freed from solvent by distillation before being combined with the organic phase.

The combined product is heated with a carboxylic acid to effect the nitrile interchange reactions, which produce the organic nitrile corresponding to the carboxylic acid and carboxylic acids corresponding to the pyridine base nitriles in the product of the reaction mixture. The interchange reaction may be carried out in the absence of a catalyst or in the presence of an acid catalyst such as sulphuric acid. The temperature at which the reaction takes place is preferably at least 200° C. and temperatures within the range 220°–250° C. are particularly preferred. At higher temperatures, particularly in the presence of a catalyst, the decarboxylation of the pyridine base carboxylic acids is favoured, and the bases themselves may be recovered from the reaction product. During the heating, the organic nitrile formed in the reaction is removed as a distillate, and volatile pyridine bases formed simultaneously will be similarly removed.

Unconverted pyridine high-boilers may be recovered and recycled to the ammoxidation.

Suitable carboxylic acids include aromatic acids having from 6 to 12 carbon atoms in the molecule exclusive of carboxyl carbon such as benzoic acid and aliphatic acids having from 1 to 10 carbon atoms exclusive of carboxyl carbon, such as acetic acid, propionic acid, or a butyric acid.

The process of the invention is further illustrated by the following example.

*Example*

Air was bubbled at the rate of 20 litres per hour through an evaporator at 120° C. containing pyridine high-boilers of approximate boiling range 150°–200° C.

The outgoing air contained 1% by volume of vaporised pyridine high-boilers. This mixture was mixed with ammonia, and fed at a rate between 2 and 3 litres per hour to a reactor containing 50 ml. of vanadium pentoxide catalyst supported on alumina maintained at 370° to 380° C.

The crude products from the reactor were dried by azeotropic distillation with benzene, and the benzene was removed by distillation. Butyric acid was added in two additions. Initially 7 grams of butyric acid was added and the mixture was refluxed. A further 5 grams of butyric acid was added and the refluxing was continued until the head temperature reduced to 118° C. When this temperature was reached a distillate was taken off, during which period the base temperature rose from 190° to 240° C. 6 grams of distillate was obtained, containing 70% by weight of butyronitrile and 20% by weight of pyridine.

I claim:
1. A process which comprises reacting from 1% to 10% by volume of pyridine high-boilers, said pyridine high-boilers having a first boiling point not lower than 150° C. and being a mixture of pyridine bases, in the vapor phase at a temperature of from 350° to 380° C. with ammonia and molecular oxygen, the reaction mixture of pyridine high-boilers, molecular oxygen and ammonia containing from 3 to 5 moles of ammonia per mole of alkyl pyridines, the molar proportions being calculated on the average molecular weight of the alkyl pyridine constituents of the pyridine high-boilers mixture, over a catalyst of vanadium pentoxide supported on alumina, condensing the resulting products thereby forming an aqueous phase and an oil phase, separating the aqueous phase and extracting same with a solvent, combining the product of extraction with the oil phase and heating the so obtained mixture in the liquid phase to a temperature of at least 200° C. with a carboxylic acid selected from the group consisting of a six-membered carbocyclic mononuclear carboxylic acid of 7 to 13 carbon atoms and an aliphatic carboxylic acid of 2 to 11 carbon atoms, thereby producing pyridine bases and organic nitrile corresponding to the said carboxylic acid.

2. The process as claimed in claim 1 in which the alumina supporting material for the catalyst has been heated to a temperature in the range of 1000° to 1400° C.

3. The process as claimed in claim 1 in which the combined oil phase is heated to a temperature in the range 220°–250° C.

4. The process according to claim 1 wherein the carboxylic acid is acetic acid.

5. The process according to claim 1 wherein the carboxylic acid is propionic acid.

6. The process according to claim 1 wherein the carboxylic acid is butyric acid.

7. The process according to claim 1 wherein the carboxylic acid is benzoic acid.

References Cited by the Examiner

FOREIGN PATENTS 483,155  5/52  Canada.

OTHER REFERENCES

Migrdichian: "Organic Synthesis," Reinhold Pub. Corp. (1957), p. 432.

Klingsberg: "Pyridine and Its Derivatives," Part 2, Interscience Pub. Inc., 1961, pp. 157, 173 and 174.

IRVING MARCUS, *Primary Examiner.*

JOHN D. RANDOLPH, WALTER A. MODANCE, *Examiners.*